United States Patent [19]
Burke

[11] Patent Number: 6,113,786
[45] Date of Patent: Sep. 5, 2000

[54] ANAEROBIC TREATMENT PROCESS WITH REMOVAL OF INORGANIC MATERIAL

[75] Inventor: Dennis A. Burke, Olympia, Wash.

[73] Assignee: Western Environmental Engineering Company, Olympia, Wash.

[21] Appl. No.: 09/038,781

[22] Filed: Mar. 11, 1998

Related U.S. Application Data

[63] Continuation-in-part of application No. 08/933,672, Sep. 19, 1997, abandoned, which is a continuation of application No. 08/632,022, Apr. 15, 1996, Pat. No. 5,670,047.

[51] Int. Cl.⁷ .................................................. C02F 3/28
[52] U.S. Cl. ........................... 210/603; 210/609; 210/631
[58] Field of Search .................................... 210/603, 612, 210/613, 614, 615, 616, 617, 631, 609

[56] References Cited

U.S. PATENT DOCUMENTS

| | | |
|---|---|---|
| 2,777,815 | 1/1957 | Forrest . |
| 2,786,025 | 3/1957 | Lamb et al. . |
| 3,847,803 | 11/1974 | Fisk . |
| 4,040,953 | 8/1977 | Ort .......................................... 210/603 |
| 4,053,394 | 10/1977 | Fisk . |
| 4,298,621 | 11/1981 | Samis et al. ............................. 210/603 |
| 4,318,993 | 3/1982 | Ghosh et al. . |
| 4,375,412 | 3/1983 | Schimel . |
| 4,491,522 | 1/1985 | Ishida et al. ............................. 210/603 |
| 4,551,250 | 11/1985 | Morper et al. . |
| 4,559,142 | 12/1985 | Morper . |
| 4,597,872 | 7/1986 | Andersson et al. . |
| 4,652,374 | 3/1987 | Cohen ..................................... 210/613 |
| 4,659,471 | 4/1987 | Molin et al. . |
| 4,722,741 | 2/1988 | Hayes et al. ............................. 210/603 |
| 4,846,975 | 7/1989 | Kelpman ................................. 210/609 |
| 5,015,384 | 5/1991 | Burke . |
| 5,185,079 | 2/1993 | Dague .................................... 210/603 |
| 5,431,819 | 7/1995 | Hack et al. . |
| 5,500,123 | 3/1996 | Srivastavn ............................... 210/613 |
| 5,525,228 | 6/1996 | Dague et al. . |
| 5,529,692 | 6/1996 | Kubler . |
| 5,599,450 | 2/1997 | Li et al. ................................... 210/603 |
| 5,670,047 | 9/1997 | Burke . |

FOREIGN PATENT DOCUMENTS

| | | |
|---|---|---|
| 55-15279 | 4/1980 | Japan . |
| 88/04282 | 6/1988 | WIPO . |

OTHER PUBLICATIONS

Riffat, Rumana and Dague, Richard R., "Laboratory studies on the anaerobic biosorption process," *Water Environment Research*, 67(7):1104–1110; Nov./Dec. 1995.

Burke, Dennis A., "Pilot Plant Operation of the AGF (Anoxic Gas Flotation) Stabilization Process at Potato Processing Facilities," International Conference Anaerobic Digestion; Japan, May 23, 1997.

Burke, Dennis A., "Anaerobic Digestion of Sewage Sludge Using the Anoxic Gas Flotation (AGF) Process," International Conference Anaerobic Digestion; Japan, May 23, 1997.

*Primary Examiner*—Christopher Upton
*Attorney, Agent, or Firm*—Christensen O'Connor Johnson & Kindness PLLC

[57] ABSTRACT

Removal of undissolved inorganic materials from an anaerobic treatment process that employs recycle or retention of anaerobic bacteria increases the efficiency of the anaerobic treatment process by removing the undissolved inorganic materials without removing substantial amounts of partially or wholly undigested organic material or anaerobic bacteria. The accumulation of inorganic materials can be minimized, thus allowing for the design of anaerobic treatment process wherein the hydrolysis of the organic materials can be maximized by focusing the reactor's design on the kinetics of the conversion of the organic material to gaseous and soluble products.

27 Claims, 5 Drawing Sheets

WASTE INORGANIC SOLIDS

ANAEROBIC TREATMENT PROCESS WITH REMOVAL OF INORGANIC MATERIAL

This application is a continuation-in-part of prior application Ser. No. 08/933,672 filed Sep. 19, 1997, abandoned, which in turn is a continuation of prior application Ser. No. 08/632,022 filed Apr. 15, 1996, now U.S. Pat. No. 5,670,047.

FIELD OF THE INVENTION

The present invention relates to anaerobic treatment processes for converting waste materials containing organic components to soluble and gaseous components that include the step of recycling or otherwise retaining anaerobic bacteria to an anaerobic reactor. More specifically, the invention relates to methods of removing undissolved inorganic materials from the treatment process in order to increase the efficiency of the anaerobic treatment process.

BACKGROUND OF THE INVENTION

It is known that the separation and recycle or otherwise retaining solids containing anaerobic bacteria will provide significant benefits during the anaerobic conversion of particulate matter found in sewage or waste water streams to soluble and gaseous products. See U.S. Pat. No. 5,015,384 to the inventor of the subject application. Also, see U.S. Pat. No. 5,514,277 to Boris M. Khudenko. The separation and recycle process preserves the bacteria responsible for conversion of organic matter to gaseous and soluble products and maintains slowly metabolized solids for prolonged periods of time within an anaerobic reactor where the slowly metabolized solids can be effectively digested.

The recycle processes described in the two patents noted above are limited by the accumulation of organic and inorganic materials within the anaerobic reactor. The accumulation of inorganic solids and precipitates can be countered by wasting solids from the anaerobic reactor. Unfortunately, the wasting of solids from the anaerobic reactor not only removes inorganic materials, but also removes the desirable biomass and also organic material that has yet to be fully digested. By wasting solids from the anaerobic reactor, the solids retention time is reduced which limits the maximum potential of the recycle system since conversion of the organic material to soluble and gaseous products is directly related to the solids retention time.

The build-up of both organic solids and inorganic solids within the anaerobic treatment process also adversely affects the completeness of mixing that can occur in the anaerobic reactors because of the higher solids concentration. As mixing efficiency decreases, the effectiveness of the anaerobic digestion of the organic materials is reduced. Additionally, as the solids concentration increases, it becomes more difficult and costly to separate dissolved components from undissolved components. For example, as the solids concentration increases, more energy and chemical conditioning is required to drive water from the solids. This action can be counterproductive to bacterial viability and process performance. For example, there is a direct relationship between the energy used in centrifuge separations of yeast and bacteria cells and the centrate SCOD resulting from cell rupture. The efficiency of membrane separation is also a function of the solids content of the feed stream, or retentate, since it has considerable influence on the permeate rate and its purity.

SUMMARY OF THE INVENTION

The present invention relates to a method for improving the efficiency of an anaerobic treatment process that includes the step of recycling or otherwise retaining anaerobic bacteria to an anaerobic reactor wherein the anaerobic bacteria are contacted with an influent containing organic material, dissolved inorganic material, and undissolved inorganic material. Examples of these types of processes are described in U.S. Pat. Nos. 5,015,384; 5,514,277; and 5,670,047, each of which is incorporated herein by reference. Generally, such type of anaerobic treatment processes which employ retained or recycled anaerobic bacteria involve the step of contacting anaerobic bacteria in the anaerobic reactor with an influent containing organic material, dissolved inorganic material, and undissolved inorganic material. In the anaerobic reactor, a portion of the organic material is converted to gaseous products and soluble products followed by separation of a portion of the soluble products from a portion of the anaerobic bacteria. The separated anaerobic bacteria is retained or recycled at some point to the anaerobic reactor for further utilization.

The present invention relates to a method of improving the efficiency of such an anaerobic treatment process by separating the undissolved inorganic material from the organic material, anaerobic bacteria, and dissolved inorganic material and subsequently removing a portion of the separated undissolved inorganic material from the anaerobic treatment process without removing a significant quantity of the organic material or anaerobic bacteria. By removing the undissolved inorganic material from the anaerobic treatment process, in accordance with the present invention, the accumulation of such materials is reduced without wasting desirable anaerobic bacteria and organic material. Through the practice of the present invention, the percentage of organic material removed by the anaerobic treatment process is increased, preferably without an increase in the volume of the anaerobic reactor.

In a preferred embodiment, the present invention relates to an anaerobic treatment process for the conversion of organic material to soluble and gaseous products that includes the step of contacting in a first anaerobic reactor, an influent stream containing the organic material with anaerobic bacteria recycled from a second reactor. The organic material is maintained in contact with the anaerobic bacteria for a predetermined period to at least partially digest the organic material. Thereafter, undissolved inorganic material is separated from the anaerobic bacteria, organic material, and dissolved inorganic material and removed from the anaerobic treatment process without removing a significant amount of the anaerobic bacteria or the organic material. After the undissolved inorganic material is removed from the anaerobic treatment process, the anaerobic bacteria and wholly or partially undigested organic material are separated from the soluble products and the separated anaerobic bacteria and the wholly or partially undigested organic material is delivered to a second anaerobic reactor for further digestion of the organic material. A portion of the anaerobic bacteria from the second anaerobic reactor is then recycled to the first anaerobic reactor.

In another preferred embodiment, the present invention relates to an anaerobic treatment process for the conversion of organic material to soluble and gaseous products that includes the step of contacting in a first anaerobic reactor, an influent containing the organic material with retained or recycled anaerobic bacteria. The organic material is maintained in contact with the anaerobic bacteria for a predetermined period to at least partially digest the organic material. Thereafter, undissolved inorganic material is separated from the anaerobic bacteria, organic material, and dissolved inorganic material and removed from the anaerobic treatment process without removing a significant amount of the anaerobic bacteria or the organic material. After the undissolved inorganic material is removed from the anaerobic treatment process, the anaerobic bacteria and partially undigested organic material are separated from the soluble products and the separated anaerobic bacteria and the partially undigested organic material is recycled back to or otherwise retained in the first anaerobic reactor.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention provides an improvement to anaerobic treatment processes such as those described in U.S. Pat. Nos. 5,015,384; 5,670,047 and 5,514,277 which employ the recycle of anaerobic bacteria to an anaerobic reactor. Briefly, referring to FIG. 1, U.S. Pat. No. 5,015,384 describes an anaerobic treatment process wherein an influent stream containing organic material to be converted to gaseous products and soluble products is delivered to anaerobic reactor 10 and contacted with anaerobic bacteria. Effluent from anaerobic reactor 10 is delivered via line 12 to separator 14 where anaerobic bacteria is separated from other constituents in the effluent and recycled via line 16 to anaerobic reactor 10. The effluent is then disposed of or subjected to further treatment.

Figure 3:
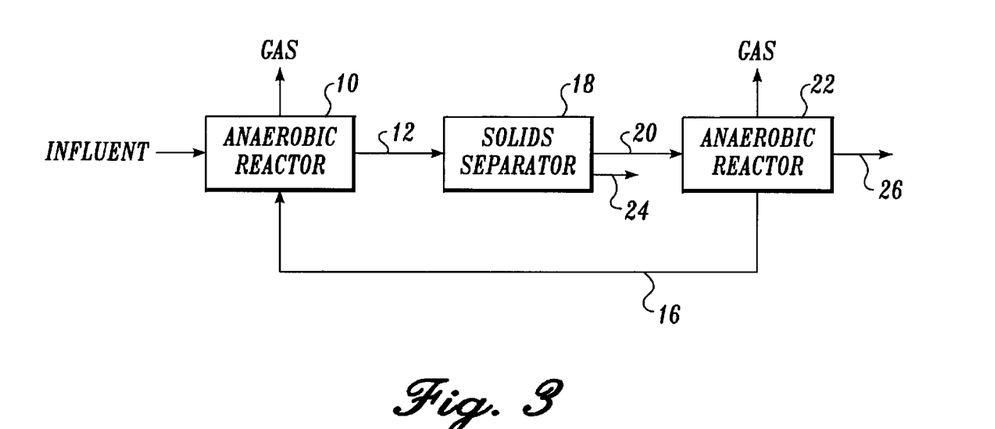
FIG. 3 is a schematic flow diagram of an anaerobic treatment process involving the recycle of anaerobic bacteria to a first anaerobic reactor as described in U.S. Pat. No. 5,670,047.

Referring to FIG. 3, a related anaerobic treatment process includes an anaerobic reactor 10 which receives influent containing organic and inorganic material to be converted to gaseous and soluble products. The organic material and anaerobic bacteria are contacted in anaerobic reactor 10. Soluble products, partially or wholly undigested organic and inorganic material, and anaerobic bacteria are delivered via line 12 to separator 18 where the solids are concentrated and then delivered via line 20 to a second anaerobic reactor 22. Separator 18 may discharge a clarified effluent via line 24 which includes soluble products, but preferably very little organic matter or anaerobic bacteria. Additional digestion of the organic material occurs in anaerobic reactor 22. Anaerobic bacteria, organic and inorganic solids, and soluble digestion products from the second anaerobic reactor 22 are recycled via line 16 to first anaerobic reactor 10. Anaerobic reactor 22 may waste digested solids via line 26.

Figure 1:
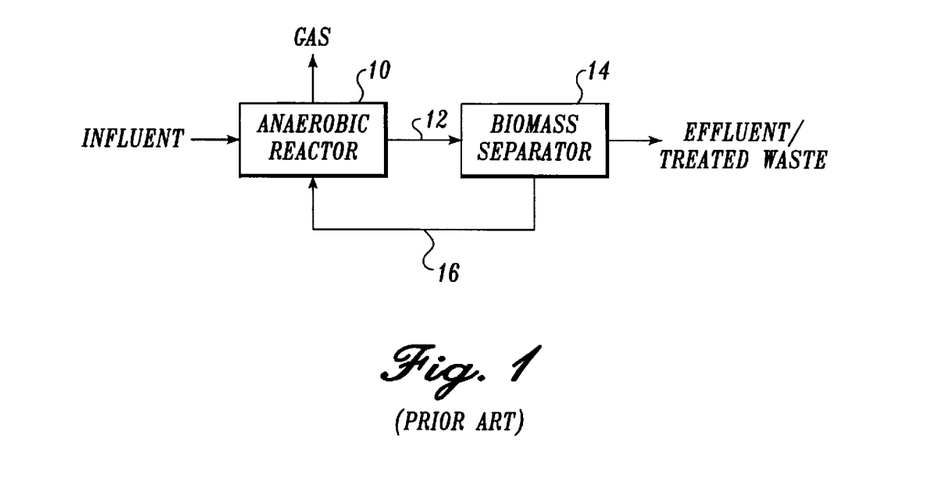
FIG. 1 illustrates a prior art anaerobic treatment process involving the recycle of anaerobic bacteria to the anaerobic reactor as described in U.S. Pat. No. 5,015,384.

Typically, the influent to anaerobic reactors 10 in FIGS. 1 and 3 in addition to organic materials, includes undissolved inorganic materials such as sand, silt, and clays, and non-biodegradable organic materials such as plastics and synthetic fibers. In addition, the influent may contain inorganic components that will form precipitates during the anaerobic treatment process. In the description below, the reference to undissolved inorganic materials includes those undissolved components in the influent stream as well as those undissolved components, such as precipitates, that are formed during the anaerobic treatment process. In addition, the influent stream includes organic material that is to be converted to gaseous soluble and insoluble products and dissolved inorganic materials from the anaerobic treatment process. The methods of the present invention are directed to the removal of undissolved inorganic materials. The dissolved inorganic materials will normally be flushed from the system as clarified effluent is removed from the anaerobic treatment process.

The methods of the present invention are the result of applicant's discovery that in anaerobic treatment processes that involve the recycle of anaerobic bacteria as described above, the accumulation of undissolved inorganic solids over time reduces the efficiency of the anaerobic treatment process. As used herein, the term "efficiency" refers to the amount of the organic material present in the influent stream that is converted to gaseous products and soluble products by the anaerobic treatment process. Based on this discovery, the inventor developed the methods described herein as a means of eliminating the build-up of undissolved inorganic materials in order to improve the efficiency of the overall anaerobic treatment process.

While not intending to be limited to any particular theory, it is believed that the increase in the efficiency of the overall anaerobic treatment process resulting from the removal of undissolved inorganic solids from the system in accordance with the present invention is a result of a reduction in the solids content of the anaerobic reactor(s) which translates into an increased biomass or organic solids retention time which has a positive impact on the conversion of organic material to gaseous products and soluble products. As described in U.S. Pat. No. 5,670,047, in order to reduce the solids content in the anaerobic reactor, a portion of the solids can be wasted. While such wasting may be effective at removing undissolved inorganic materials from the treatment process, it also results in the wasting of valuable anaerobic bacteria as well as organic material which must then be further processed in order to make it suitable for disposal. The method of the present invention achieves the advantages of removing undissolved inorganic solids from the anaerobic treatment process without the undesirable removal of anaerobic bacteria from the process or the removal of partially or wholly undigested organic material.

The removal of the undissolved inorganic materials in accordance with the present invention and the flushing of dissolved inorganic materials from the system in the waste effluent streams results in a system that is limited in its efficiency by the hydrolysis of the organic material, rather than the build-up of inorganic materials. Through the practice of the present invention, the hydrolysis of the organic materials can be maximized by focusing the reactor design on the kinetics of the conversion of the organic material to gaseous and soluble products.

Another advantage of removing inorganic solids from an anaerobic treatment process in accordance with the present invention is the reduction in the solids concentrations present during various solids separation steps. The quantity of solids processed through a separator affects the size of the equipment and the quantity of chemicals, if necessary, that are required. Thus, when the solids concentrations are reduced, the size of the separator can be reduced as well as the chemical requirements. In addition, by reducing the solids concentration in the reactors and separators, any mixing that is necessary at these stages requires less energy input. In addition to the energy and chemical savings, reducing the energy requirements and chemical requirements can have a positive effect on the microbial viability and process performance.

Figure 2:
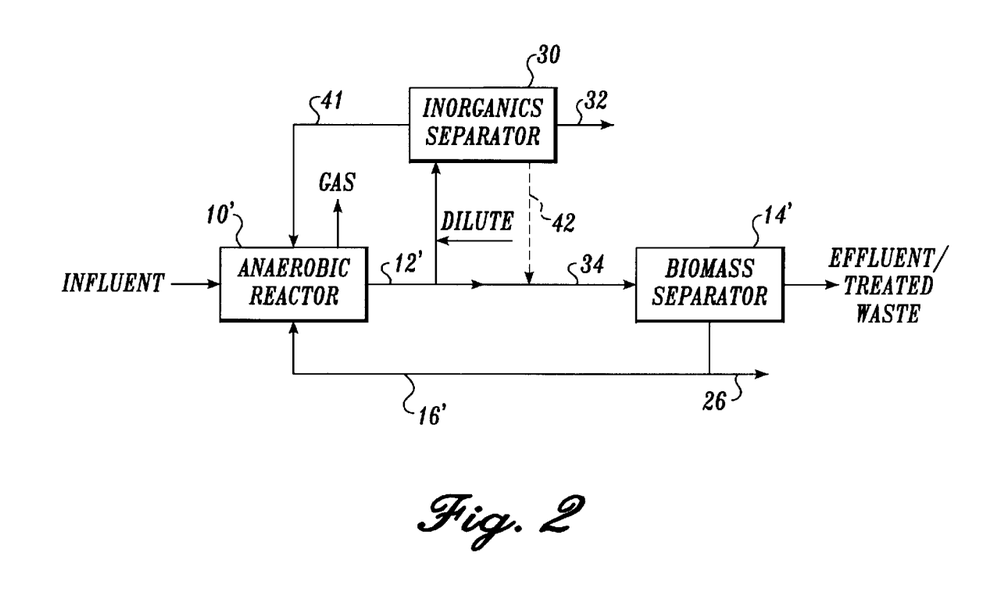
FIG. 2 is a schematic flow diagram of the method of the present invention applied to the prior art process of FIG. 1.

Referring to FIG. 2, the process of FIG. 1 is essentially reproduced. Those unit operations identical to those set forth in FIG. 1 are identified by the same reference numeral with the added designation of a prime symbol. In accordance with a preferred embodiment of the present invention, a portion of the effluent 12' from anaerobic reactor 10' is treated in separator 30 where undissolved inorganic material is separated from soluble products of digestion, partially or wholly digested organic material, anaerobic bacteria, and dissolved inorganic materials. The portion of effluent line 12' that is not diverted to separator 30 is delivered to biomass separator 14' via line 34. The undissolved inorganic materials separated by separator 30 are removed from the anaerobic treatment process via line 32. The effluent (41) from separator 30 is preferably returned to anaerobic reactor 10'. The advantage of delivering the effluent (41) from separator 30 to anaerobic reactor 10' is that the anaerobic bacteria, soluble products of digestion, dissolved inorganic material, and organic material in the effluent is recycled for further treatment. The effluent from separator 30 may however, be discharged to the biomass separator 14', via lines 42 and 34. Transferring the effluent from separator 30 along lines 42 and 34 will not reduce the hydraulic retention time of anaerobic reactor 10', if dilution water is used to assist in the inorganic solids separation carried out in separator 30. Separator 30 should remove undissolved inorganic material from the other components in line 12' without adversely affecting the anaerobic bacteria viability. The anaerobic bacteria may be adversely affected by the separation process carried out in the inorganic separator if a high solids content is maintained in anaerobic reactor 10'. Under such circumstances, the efficiency of separator 30 can be enhanced, without adverse effect on bacterial viability, by adding dilution, or elutriation water to the influent to separator 30, and thereby carrying out the inorganic solids separation under dilute conditions. The dilution water may be obtained from the process effluent or any other source. In addition, separator 30 should effectively remove undissolved inorganic material from the other components without carrying with it significant amounts of the anaerobic bacteria, soluble products, dissolved inorganic material, or organic material. Any separation device that can achieve the above results can be used in accordance with the present invention. For example, separators that operate on the principal of density differences can be employed. Such types of separators include cyclones, hydrocyclones, centrifuges, gravity, and combination gravity and centrifugal separators. FIG. 2 illustrates a preferred embodiment of the present invention wherein the separator 30 is positioned between anaerobic reactor 10' and biomass separator 14'. Positioning separator 30 at this location is preferred because effluent in line 12' is the most dilute stream providing the best opportunity for unhindered separation after anaerobic digestion which removes organic constituents such as oil and grease, resulting in higher specific gravities for inorganic particles. Effective removal of undissolved inorganic materials can also be accomplished by positioning separator 30 at different locations within the illustrated process. For example, separator 30 could be located in line 16', or could be incorporated into anaerobic reactor 10' or even the influent to anaerobic reactor 10'. If the separator is incorporated into the influent line for anaerobic reactor 10', where it does not have an opportunity to treat materials in recycle stream 16', it is preferred that an additional separator be provided at a location that permits it to remove undissolved inorganic materials in the form of inorganic precipitates or other inorganic materials that are not present in the influent stream but are formed during the anaerobic treatment process. Alternatively, recycled anaerobic bacteria in line 16' can be combined with the influent before the combined stream is passed through a separator to remove undissolved inorganic materials. As mentioned above, an important aspect of the method of the present invention is the removal of the undissolved inorganic materials from an anaerobic treatment process without the removal of significant amounts of anaerobic bacteria, soluble products of digestion, dissolved inorganic materials or partially or wholly undigested organic material. The anaerobic bacteria, soluble products of digestion, dissolved inorganic materials, and partially or wholly undigested organic material that are not diverted to separator 30 are delivered via line 34 to biomass separator 14' where the anaerobic bacteria and undigested organic material is collected and recycled via line 16' to anaerobic reactor 10'. A portion of material in line 16' can be removed as waste solids via line 26. Treated waste in the form of effluent is removed from biomass separator 14'. While it is understood that no separation technique is 100% efficient, and therefore stream 32 will include small amounts of anaerobic bacteria, soluble inorganic materials and partially or wholly undigested organic materials, such amounts should be at minimal levels that do not adversely impact the overall performance of the anaerobic treatment process. Preferably, less than 15% of the anaerobic bacteria and less than 15% of the organic material treated by separator 30 is lost when the undissolved inorganic material is removed, (i.e., 85% inorganic content is achieved).

Figure 4:
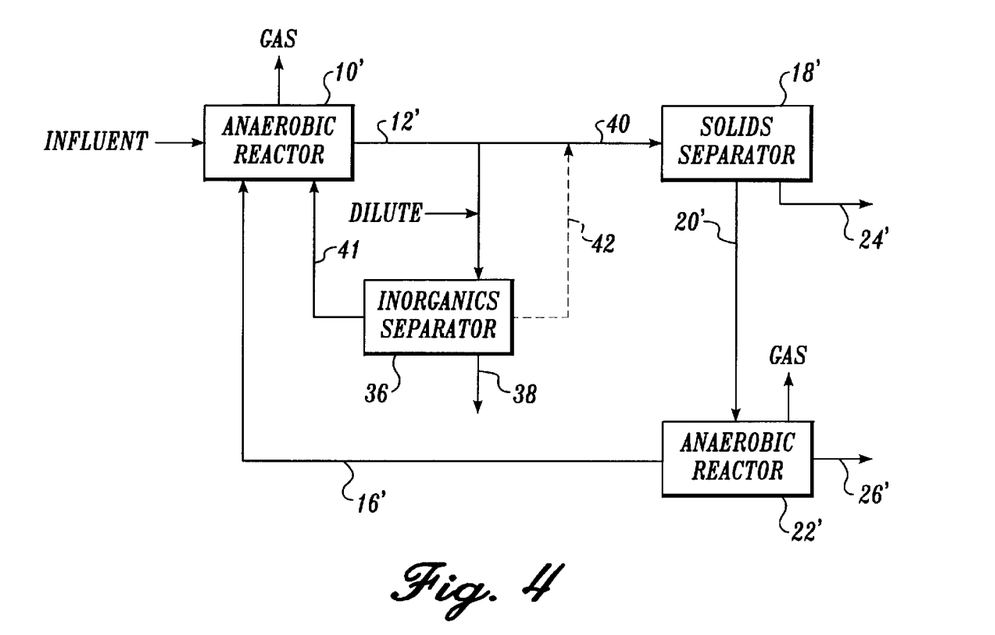
FIG. 4 is a schematic flow diagram illustrating a preferred embodiment of the method of the present invention applied to the anaerobic treatment process of FIG. 3.

In a second embodiment illustrated in FIG. 4, the method of the present invention is applied to the anaerobic treatment process of FIG. 3. The unit operations of FIG. 4 which are identical to those in FIG. 3 are identified by the same numeral with a prime added. In the process illustrated in FIG. 4, separator 36 performs the identical function as described above with respect to separator 30 in FIG. 2. The undissolved inorganic material separated in separator 36 is removed from the anaerobic treatment process through line 38 and is preferably free of any significant amounts of the soluble products, partially or wholly undigested organic material, dissolved inorganic material and anaerobic bacteria. The stream remaining after the undissolved inorganic material is removed contains primarily anaerobic bacteria, dissolved inorganic materials and partially or wholly undigested organic material is delivered from separator 36 back to anaerobic reactor 10' along line 41 for further treatment. The portion of effluent 12' that is not diverted to separator 36 is delivered via line 40 to separator 18' where the solids are concentrated and then delivered to second anaerobic reactor 22'. Again, it should be understood that separator 36 in FIG. 4 illustrates a preferred embodiment; however, separator 36 can be provided at different locations, such as in lines 20', 16' or even the influent line to anaerobic reactor 10'. In addition, separator 36 can be provided within anaerobic reactor 10' or anaerobic reactor 22'. The influent delivered to separator 36 can be diluted to improve separation efficiency. The effluent from separator 36 can be returned to the anaerobic reactor 10' along line 41 or delivered to the solids separator 18' along lines 42 and 40.

The present invention is described above and illustrated in FIGS. 2–4 as a continuous flow process. As an alternative to the processes illustrated in FIGS. 2–4, the present invention can be practiced by combining the separation and anaerobic digestion functions within a single reactor or vessel. An example of such a single vessel system is a sequencing batch reactor. In a sequencing batch reactor system, biomass is retained within a reaction vessel by separating the biomass from the substrate within the reaction vessel. A sequencing batch reactor system typically consists of one or more reactors operating in parallel to provide a constant flow system. In the context of the present invention, a sequencing batch reactor can be operated in the following sequence: (1) filling the reactor which has an initial mass of bacteria; (2) reacting the influent substrate with the initial mass of bacteria; (3) separating the biomass from the treated substrate; and (4) withdrawing the treated substrate from the reactor while maintaining the biomass within the reactor. The removal of inorganic solids in accordance with the present invention can be achieved by removing the inorganic solids following the introduction of the influent into the reactor or after the reaction step. As an additional alternative, the removal of inorganic solids can be carried out in conjunction with the filling step or the reaction steps.

Figure 5A:
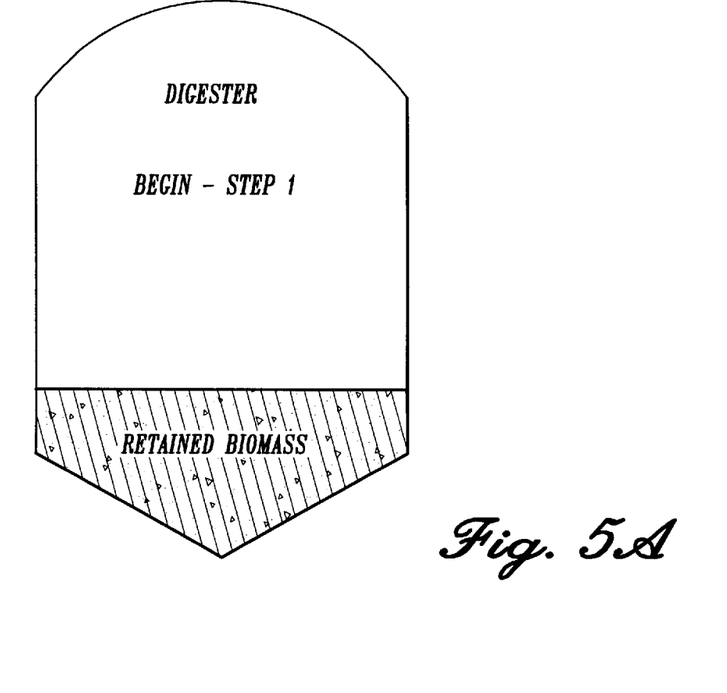
FIGS. 5a–5f is a schematic diagram of an anaerobic treatment process of the present invention carried out using a sequencing batch reactor.
Figure 5B:
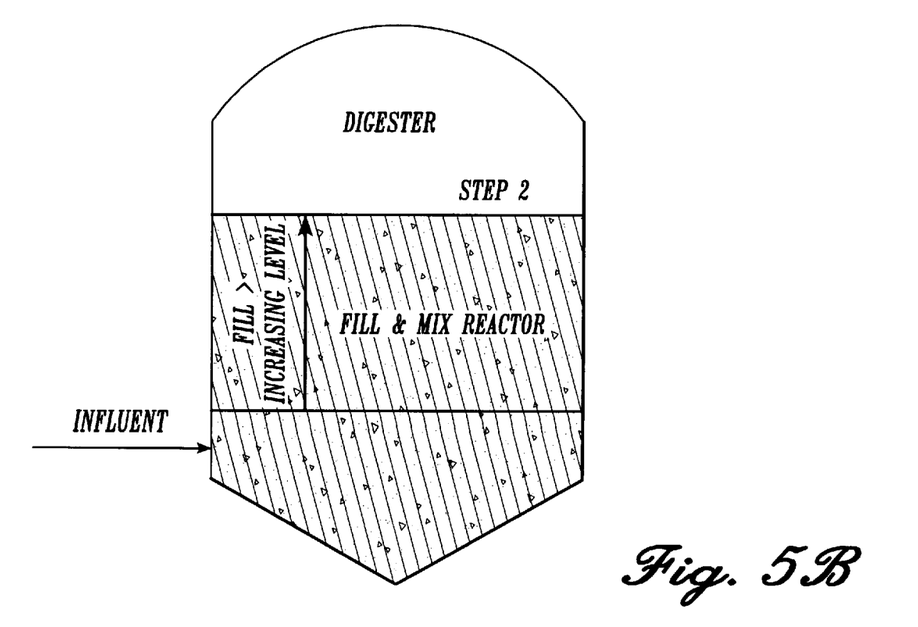
Figure 5C:
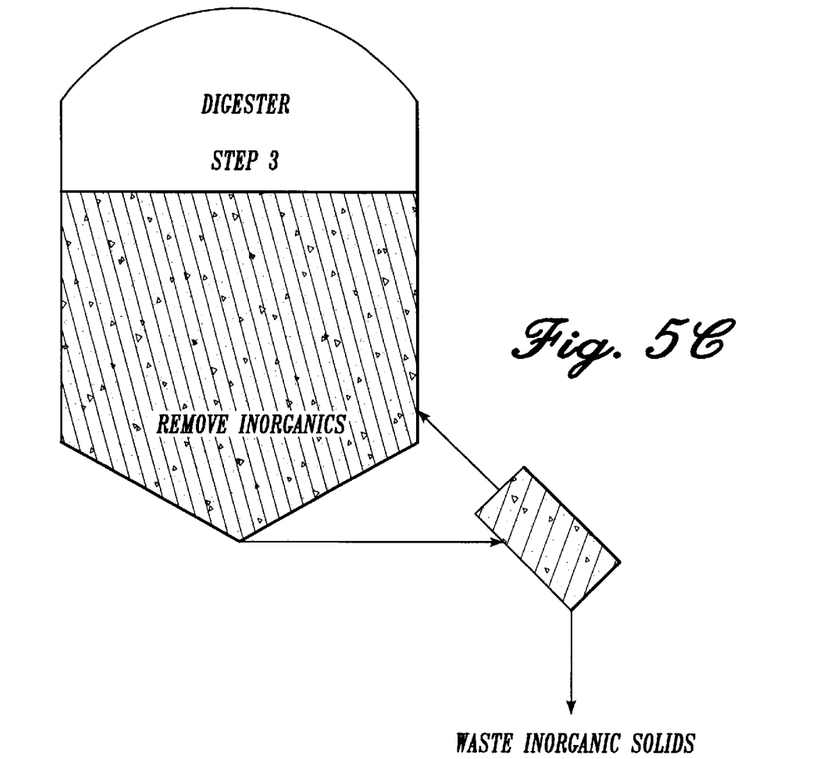
Figure 5D:
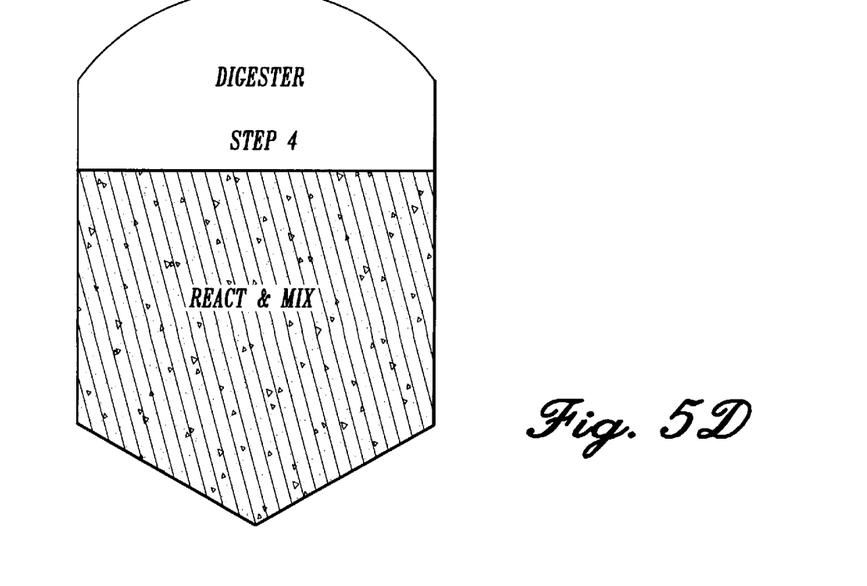
Figure 5E:
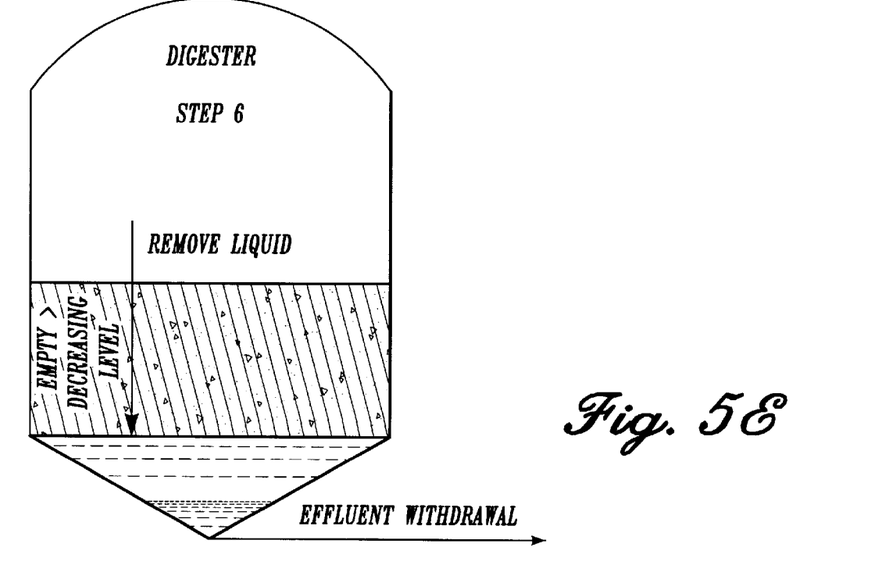
Figure 5F:
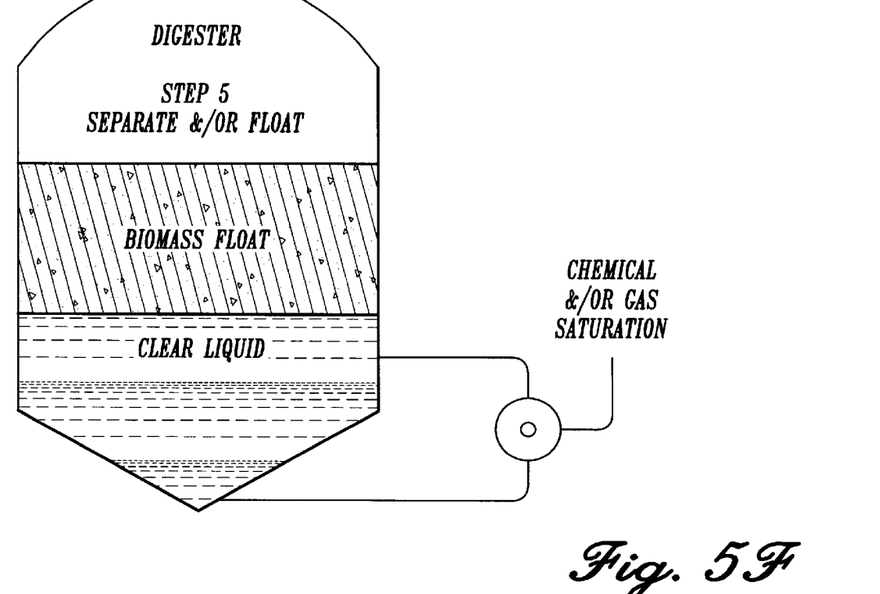

Referring to FIGS. 5a–5f, an exemplary process using a sequencing batch reactor to carry out the present invention is illustrated. For the purposes of simplicity, mixing devices, draft tubes, and biomass separation devices are not illustrated since a wide variety of equipment and configurations can be used. Referring to FIG. 5a, the process begins with a reactor containing a quantity of retained bacteria used to carry out anaerobic digestion. In FIG. 5b, influent is added to the reactor. During this step, contacting, or mixing the substrate with the biomass is desirable. In accordance with the present invention, inorganic solids may be removed during this contacting or mixing step. In FIG. 5c, inorganic solids can be removed from the reactor using an external inorganic solids removal device such as those described above which rely upon density differentials. In FIGS. 5a–f, the independent removal of inorganic solids is shown to precede the reaction steps; however, it should be understood that the inorganic solids removal step can follow the reaction step or be carried out in conjunction with the reaction step. Referring to FIG. 5d, the biomass and influent substrate are allowed to react for a predetermined period of time to achieve the desired effluent quality. Removal of inorganic solids can also be accomplished prior to, in conjunction with, or during this reaction step. In FIG. 5e, biomass is separated from the mixed liquor, for example by floatation or other means. In FIG. 5f, effluent is withdrawn from the reactor without removing biomass. The sequencing batch reactor can be operated in a batch mode as described above, or in a continuous mode with more than one sequencing batch reactor in order to achieve continuous or semicontinuous flow.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of improving the efficiency of an anaerobic treatment process wherein anaerobic bacteria are contacted in an anaerobic reactor with an influent containing organic material, non-biodegradable organic material, dissolved inorganic material, and undissolved inorganic material, and a portion of the organic material is converted to gaseous products and soluble products in the anaerobic reactor, followed by separation of a portion of the soluble products from a portion of the anaerobic bacteria, the separated anaerobic bacteria being recycled to the anaerobic reactor, the method comprising:

separating the undissolved inorganic material from the organic material, anaerobic bacteria, and dissolved inorganic material after a portion of the organic material in the influent to the anaerobic reactor is converted to gaseous products and soluble products and before a portion of the soluble products are separated from a portion of the anaerobic bacteria; and removing a portion of the separated undissolved inorganic material from the anaerobic treatment process without removing a significant quantity of the organic material or anaerobic bacteria.

2. The method of claim 1, wherein the undissolved inorganic material is separated from the organic material, the anaerobic bacteria and the dissolved inorganic material using a differential density separator.

3. The method of claim 2, where the differential density separator is selected from the group consisting of cyclones, hydrocyclones, and centrifuges.

4. The method of claim 1, wherein the separating step further comprises the addition of dilution water.

5. The method of claim 1, wherein the inorganic material is selected from the group consisting of silt, sand, and precipitates of inorganic material in the influent.

6. The method of claim 1, further comprising the step of returning the organic material, anaerobic bacteria and dissolved inorganic material separated from the undissolved inorganic material to the anaerobic reactor.

7. The method of claim 1, wherein the separating step is carried out on the influent to the anaerobic reactor.

8. An anaerobic treatment process for the conversion of organic material to soluble and gaseous products comprising the steps:

contacting in a first anaerobic reactor, an influent stream containing the organic material with anaerobic bacteria recycled from a second reactor;

maintaining the organic material in contact with the anaerobic bacteria for a predetermined period to at least partially digest the organic material;

separating undissolved inorganic material from the organic material, anaerobic bacteria and dissolved inorganic material and removing the separated undissolved inorganic material from the anaerobic treatment process without removing a significant amount of the anaerobic bacteria or the organic material;

separating anaerobic bacteria and wholly or partially undigested organic material from the soluble products;

delivering the separated anaerobic bacteria and the wholly or partially undigested organic material to the second anaerobic reactor for further digestion of the organic material; and recycling anaerobic bacteria from the second anaerobic reactor to the first anaerobic reactor.

9. The method of claim 8, wherein the undissolved inorganic material is separated from the organic material, the anaerobic bacteria and the dissolved inorganic material using a differential density separator.

10. The method of claim 9, wherein the differential density separator is selected from the group consisting of cyclones, hydrocyclones and centrifuges.

11. The method of claim 8, wherein the step of separating undissolved inorganic material from the organic material, anaerobic bacteria and dissolved inorganic material utilizes dilution water.

12. The method of claim 8, wherein the inorganic material is selected from the group consisting of silt, sand, and precipitates of inorganic material in the influent.

13. The method of claim 8 further comprising the step of returning the organic material, anaerobic bacteria and dissolved inorganic material separated from the undissolved inorganic material to the anaerobic reactor.

14. An anaerobic treatment process for the conversion of organic material to soluble and gaseous products comprising the steps:

contacting an influent stream containing the organic material with recycled anaerobic bacteria in an anaerobic reactor;

maintaining the organic material in contact with the anaerobic bacteria for a predetermined period to partially digest the organic material;

separating undissolved inorganic material from the anaerobic bacteria and organic material after a portion of the organic material in the influent to the anaerobic reactor is converted to gaseous products and soluble products and before a portion of the soluble products are separated from a portion of the anaerobic bacteria, and removing the separated undissolved inorganic material from the anaerobic treatment process without removing a significant amount of the anaerobic bacteria or the organic material;

separating anaerobic bacteria from the soluble products; and recycling the anaerobic bacteria separated from the soluble products to the anaerobic reactor.

15. The method of claim 14, wherein the undissolved inorganic material is separated from the organic material, the anaerobic bacteria and dissolved inorganic material using a differential density separator.

16. The method of claim 15, wherein the differential density separator is selected from the group consisting of cyclones, hydrocyclones, and centrifuges.

17. The method of claim 15, further comprising the step of returning the organic material, anaerobic bacteria and dissolved inorganic material separated from the undissolved inorganic material to the anaerobic reactor.

18. The method of claim 14, wherein the step of separating undissolved inorganic material from anaerobic bacteria and organic material utilizes dilution water.

19. The method of claim 14, wherein the inorganic material is selected from the group consisting of silt, sand, and precipitates of organic material in the influent.

20. A method of improving the efficiency of an anaerobic treatment process wherein anaerobic bacteria are contacted in an anaerobic reactor with an influent containing organic material, non-biodegradable organic material, dissolved inorganic material, and undissolved inorganic material, and a portion of the organic material is converted to gaseous products and soluble products in the anaerobic reactor, followed by separation of a portion of the soluble products from a portion of the anaerobic bacteria, the separated anaerobic bacteria being retained in the anaerobic reactor, the method comprising:

separating the undissolved inorganic material from the organic material, anaerobic bacteria, and dissolved inorganic material after a portion of the organic material in the influent to the anaerobic reactor is converted to gaseous products and soluble products and before a portion of the soluble products is separated from a portion of the anaerobic bacteria;

removing a portion of the separated undissolved inorganic material from the anaerobic treatment process without removing a significant quantity of the organic material or anaerobic bacteria; and removing soluble products of digestion from the anaerobic treatment process.

21. The method of claim 20, wherein the anaerobic reactor is a batch reactor and the separating step is carried out in the batch reactor.

22. The method of claim 21, wherein the batch reactor is a sequencing batch reactor.

23. The method of claim 20, wherein the separating step is carried out after a portion of the organic material in the influent to the anaerobic reactor is converted to gaseous products and soluble products and before a portion of the soluble products are separated from a portion of the anaerobic bacteria.

24. The method of claim 23, wherein the separating step further comprises the addition of dilution water.

25. The method of claim 20, wherein the inorganic material is selected from the group consisting of silt, sand, and precipitates of inorganic material in the influent.

26. An anaerobic treatment process for the conversion of organic material to soluble and gaseous products comprising the steps:

contacting an influent stream containing the organic material with retained anaerobic bacteria in an anaerobic reactor;

maintaining the organic material in contact with the anaerobic bacteria for a predetermined period to partially digest the organic material;

separating undissolved inorganic material from the anaerobic bacteria and organic material after a portion of the organic material in the influent to the anaerobic reactor is converted to gaseous products and soluble products and before a portion of the soluble products is separated from a portion of the anaerobic bacteria;

removing the separated undissolved inorganic material from the anaerobic treatment process without removing a significant amount of the anaerobic bacteria or the organic material;

separating anaerobic bacteria from the soluble products;

retaining the anaerobic bacteria separated from the soluble products in the anaerobic reactor; and removing a portion of the soluble products of digestion from the anaerobic treatment process.

27. The method of claim 26, wherein the inorganic material is selected from the group consisting of silt, sand, and precipitates of organic material in the influent.

* * * * *

UNITED STATES PATENT AND TRADEMARK OFFICE
CERTIFICATE OF CORRECTION

PATENT NO. : 6,113,786
DATED : September 5, 2000
INVENTOR(S) : D.A. Burke

It is certified that error appears in the above-identified patent and that said Letters Patent is hereby corrected as shown below:

| COLUMN | LINE | ERROR |
|---|---|---|
| [56]<br>Pg. 1, col. 2 | Refs. Cited<br>(U.S. Pats.,<br>Item 1) | "Srivastavn" should read --Srivastava-- |
| [57]<br>Pg. 1, col. 2 | Abstract<br>8 of text | "design of anaerobic" should read --design of an anaerobic-- |
| 9<br>(Claim 13, | 4<br>line 1) | after "8" insert --,-- |
| 10<br>(Claim 23, | 23<br>line 5) | "are separated" should read --is separated-- |

Signed and Sealed this

Twenty-ninth Day of May, 2001

Attest:

NICHOLAS P. GODICI

Attesting Officer    Acting Director of the United States Patent and Trademark Office